United States Patent [19]

Wang

[11] Patent Number: 5,268,430
[45] Date of Patent: Dec. 7, 1993

[54] METHACRYLATE-BUTADIENE-STYRENE GRAFT POLYMER AND ITS PVC BLENDS HAVING LOW YELLOWNESS, GOOD CLARITY, AND IMPROVED IMPACT STRENGTH

[75] Inventor: I-Chung W. Wang, Vienna, W. Va.

[73] Assignee: General Electric Company, Pittsfield, Mass.

[21] Appl. No.: 760,721

[22] Filed: Sep. 16, 1991

[51] Int. Cl.$^5$ .................. C08F 285/00; C08F 279/02; C08L 27/06

[52] U.S. Cl. .................. 525/310; 525/83; 525/84; 525/902

[58] Field of Search .................. 525/310, 902

[56] References Cited

U.S. PATENT DOCUMENTS

| | | |
|---|---|---|
| 2,943,074 | 6/1960 | Feuer . |
| 3,264,373 | 8/1966 | Whitworth, Jr. et al. . |
| 3,287,443 | 11/1966 | Saito et al. . |
| 3,288,886 | 11/1966 | Himei et al. . |
| 3,444,269 | 5/1969 | Beer . |
| 3,445,416 | 5/1969 | Condo . |
| 3,644,249 | 2/1972 | Ide et al. . |
| 3,644,250 | 2/1972 | Ide et al. . |
| 3,646,163 | 2/1972 | Taima et al. . |
| 3,651,177 | 3/1972 | Saito et al. . |
| 3,652,483 | 3/1972 | Tanaka et al. . |
| 3,657,390 | 4/1972 | Tanaka et al. . |
| 3,670,052 | 6/1972 | Saito et al. . |
| 3,671,610 | 6/1972 | Amagi et al. . |
| 3,772,409 | 11/1973 | Scarso et al. . |
| 3,775,514 | 11/1973 | Amagi et al. . |
| 3,842,144 | 10/1974 | Tanaka et al. . |
| 3,886,235 | 5/1975 | Tanaka et al. . |
| 3,887,652 | 6/1975 | Carrock et al. . |
| 3,899,547 | 8/1975 | Amagi et al. . |
| 3,907,928 | 9/1975 | Kumabe et al. . |
| 3,922,320 | 11/1975 | Love . |
| 4,041,106 | 8/1977 | Ide et al. . |
| 4,078,018 | 3/1978 | Chauvel et al. . |
| 4,362,845 | 12/1982 | Kamata .................. 525/310 |
| 4,379,876 | 4/1983 | Clikeman et al. .................. 524/109 |
| 4,423,188 | 12/1983 | Witschard .................. 525/71 |
| 4,431,772 | 2/1984 | Katto et al. .................. 525/80 |
| 4,443,585 | 4/1984 | Goldman .................. 525/310 |
| 4,508,876 | 4/1985 | Takaki et al. .................. 525/310 |
| 4,624,987 | 11/1986 | Hosoi et al. .................. 525/84 |
| 4,767,833 | 8/1988 | Yumoto et al. .................. 525/193 |
| 5,043,386 | 8/1991 | Kishida et al. .................. 525/84 |

FOREIGN PATENT DOCUMENTS 1299400 12/1962 United Kingdom .
1251403 10/1971 United Kingdom .

*Primary Examiner*—David J. Buttner

[57] ABSTRACT

Multi-stage rubber-based MBS resin compositions are provided which include a polymeric substrate stage of a conjugated diolefin-based polymer or copolymer and optional units derived from a cross-linking agent or agents, and at least one polymeric graft stage graft polymerized in the presence of the substrate stage which include monomers of an acrylate, a vinyl aromatic, or a mixture of those monomers and optional units derived from a cross-linking agent or agents and/or units which serve as a graft-linking agent or agents wherein the weight ratio of acrylate in all graft stages combined to vinyl aromatic in all graft stages combined is at least 1.2:1. Additionally, modified vinyl chloride polymer compositions which include a vinyl chloride polymer or copolymer in combination with an impact modifying, yellowness index improving amount of the multi-stage rubber-based resin compositions above are provided. These modified vinyl chloride polymer compositions have a low yellowness index, good clarity, and desirable impact properties. Finally, processes for the production of the above compositions are provided.

8 Claims, No Drawings

METHACRYLATE-BUTADIENE-STYRENE GRAFT POLYMER AND ITS PVC BLENDS HAVING LOW YELLOWNESS, GOOD CLARITY, AND IMPROVED IMPACT STRENGTH

FIELD OF THE INVENTION

The present invention relates to multi-stage methacrylate-butadiene-styrene (MBS) graft polymer compositions which have, in all combined graft stages, a weight ratio of alkyl(meth)acrylate to aromatic vinyl monomer of at least 1.2:1 and to a process for the preparation thereof. More particularly, an MBS resin is provided which can impart excellent impact resistance to vinyl chloride polymers without increasing the yellowness and impairing the transparency of the vinyl chloride polymers.

BACKGROUND OF THE INVENTION

It is known that graft polymers of methyl (meth)acrylate, styrene, acrylonitrile or the like grafted onto a butadiene-rich substrate, generally called MBS resins, are useful as reinforcement for enhancing the impact strength of vinyl chloride polymers or copolymers, generally termed PVC. However, such improvement is more often attainable at the expense of impairing the whiteness or the transparency of the obtained PVC moldings. Therefore, it is the object of the present invention to provide an MBS resin useful as a vinyl chloride polymer modifier capable of improving the impact resistance without impairing PVC's inherent whiteness and transparency.

Many types of modifiers have been employed in the prior art to achieve impact improvement in PVC. Typically, due to various reasons including the relative incompatibility of these modifiers and the differences in reflective index between the modifiers and the vinyl chloride polymers, most modifiers have failed to sustain good optical properties such as transparency, and, particularly, whiteness which are PVC's inherent advantages over other resins commonly used.

Whitworth et al, U.S. Pat. No. 3,264,373, disclose vinyl chloride compositions impact modified with a graft polymer of methyl(meth)acrylate on a butadiene-/alkyl acrylate copolymer wherein the alkyl acrylate has a heat distortion temperature of less than 0° C.

Graft polymer compositions comprising 10 to 70 percent by weight of a polymer or a copolymer of butadiene and grafts of firstly methyl(meth)acrylate and cross-linker, and secondly of styrene, and thirdly of methyl(meth)acrylate with an optional cross-linker, were blended to improve PVC's impact strength without crease whitening in U.K. Patent Specification No. 1,251,403.

Beer, U.S. Pat. No. 3,444,269, combined a vinyl halide graft copolymer of a vinyl halide monomer or copolymerizable monomer mixture and a chlorinated ethylene polymer with a methacrylate-butadiene-styrene (MBS)-type resin prepared by the one step polymerization of a mixture of styrene, methyl(meth)acrylate onto a butadiene-based rubbery copolymer wherein the ratio of styrene to methyl(meth)acrylate ranged from about 2:1 to about 1:2.

Idide et al, in U.S. Pat. Nos. 3,644,249 and 3,644,250, attempted to improve the transparency, impact strength, and/or surface gloss of polyvinyl chloride resin compositions by combining them with graft polymers in which either methyl(meth)acrylate and subsequently styrene, or styrene and subsequently methyl (meth)acrylate, were grafted to an elastomer of butadiene, n-butyl acrylate, and styrene in accordance with a ternary constitutional diagram.

Tanaka et al, U.S. Pat. No. 3,652,483, sought improve the impact properties without impairing other physical and chemical properties of vinyl chlorides by adding a graft copolymer of butadiene-styrene-methyl(meth)acrylate, co-precipitated with a polymethyl(meth)acrylate latex having a specific relative viscosity.

Mixtures of MBS-type resins with various refractive indexes have been used to improve the color transparency and the impact resistance of polyvinyl chloride resins by Tanaka et al, U.S. Pat. No. 3,657,390.

Tanaka, U.S. Pat. No. 3,842,144, discloses polyvinyl chlorides with impact modifiers obtained by the graft polymerization of two graft stages on a cross-linked butadiene/acrylate rubber latex in a sequential two stage process. There is no preference for the weight ratios of graft monomers.

Love, U.S. Pat. No. 3,922,320, has found that impact strength and processing characteristics are improved by the incorporation in polyvinyl chloride resins of an SAN resin and an MBS-type modifier prepared by grafting methyl(meth)acrylate and styrene onto polybutadiene in proportions of 15 to 30 percent of methyl(meth)acrylate units, 40 to 65 percent of butadiene units, and 10 to 40 percent of styrene units.

Polymers of butadiene and an alkyl acrylate grafted with an acrylic monomer, a styrene monomer, and an optional cross-linker and having an agglomerated particle size of 0.1 to 1 micron were prepared and were blended with polyvinyl chloride compositions by Chauvell et al, U.S. Pat. No. 4,078,018.

MBS-type resins have been rendered resistant to yellowing under mild oxidative conditions by the addition of 1,1,3-tris-(2-methyl-4-hydroxy-5-tert-butyl phenol) butane or the like in Clikemen et al, U.S. Pat. No. 4,379,876. Vinyl chloride polymers have been blended with these MBS-type resins as well.

Polyvinyl chlorides have also been blended with MBS-type resins that have been modified by the addition of a thermoplastic block elastomer which includes the residue of a monoalkenyl aromatic hydrocarbon and an alkadiene hydrocarbon which is normally incompatible with the vinyl halide polymer. The weight ratio of block elastomer to (meth)acrylate polymer ranges from about 1:5 to about 5:1. Wilschard, U.S. Pat. No. 4,423,188, reports that resultant molded articles are impact resistant and are substantially transparent and translucent.

Goldman, U.S. Pat. No. 4,443,585, prepares MBS-type resin compositions having a first stage of at least 70 percent butadiene and at least 10 percent $C_2$-$C_8$ alkyl acrylate, a second stage of at least 80 percent styrene, and a third stage of at least 50 percent methyl(meth)acrylate and at least 1 percent $C_1$-$C_4$ alkyl acrylate with a ratio of third stage to second stage of at least 1:1. These MBS-type resins are also blended with polyvinyl chloride resins.

Multi-stage produced high butadiene content MBS-type resins were found by Takaki et al, U.S. Pat. No. 4,508,876, to improve the impact resistance of vinyl chloride polymers without impairing their transparency.

Additionally, Hosoi et al, U.S. Pat. No. 4,624,987, disclose vinyl chloride polymer compositions reportedly capable of imparting solvent resistance, transparency and impact resistance to a molded article. These compositions include 5 to 50 percent of an MBS-type resin prepared by grafting a first stage predominantly of methyl(meth)acrylate and a second stage predominantly of styrene onto a butadiene/styrene rubber substrate wherein the first graft stage is 40 to 80 percent by weight of first and second graft stages combined and wherein the seed-polymerized SBR rubber has an average particle size of not less than 1500 angstroms.

Vinyl chloride resins have also been combined with various amounts of various MBS-type resins which are prepared by various methods as seen in U.S. Pat. Nos. 2,943,074; 3,287,443; 3,445,416; 3,651,177; 3,670,052; 3,772,409; 3,907,928; 4,041,106; and U.K. Patent Specification No. 1,299,400.

All of the above combinations and compositions suffer from one or more deficiencies not observed in the compositions of the present invention.

SUMMARY OF THE INVENTION

According to the present invention, there are provided multi-stage rubber-based resin compositions comprising (a) a polymeric substrate stage comprising a conjugated diolefin-based polymer or copolymer and optionally units derived from a cross-linking agent or agents; and (b) at least one polymeric graft stage graft polymerized in the presence of the substrate stage comprising monomers of an acrylate and preferably an alkyl(meth)acrylate, a vinyl aromatic, a methacrylate/vinyl aromatic and preferably an alkyl(meth)acrylate/vinyl aromatic copolymer or a combination of any of the foregoing monomers, and optionally, units derived from a cross-linking agent or agents, units which serve as a graft-linking agent or agents, units derived from a cross-linking agent or agents and units from the same or a different agent or agents which serve as a graft-linking agent or agents, or a combination of any of the foregoing units; wherein the weight ratio of methacrylate and preferably alkyl(meth)acrylate in all graft stages combined to vinyl aromatic in all graft stages combined is at least 1.2:1.

In a further contemplated preferred embodiment, the substrate is a copolymer comprising monomers of a conjugated diolefin, at least one vinyl aromatic, and optionally units derived from a cross-linking agent or agents; and the graft stages (b) include (i) a polymeric first graft stage graft polymerized in the presence of the substrate stage comprising monomers of an alkyl(meth)acrylate, a vinyl aromatic which may be the same as or different than that of the substrate, an alkyl(meth)acrylate/vinyl aromatic copolymer or a combination of any of the foregoing monomers, and optionally, units derived from a cross-linking agent or agents, units which serve as a graft-linking agent or agents, units derived from a cross-linking agent or agents and units of the same or a different agent or agents which serve as a graft linking agent or agents, or a combination of any of the foregoing units; optionally (ii) one or more polymeric intermediate graft stages graft polymerized in the presence of any previous stages, each intermediate graft stage independently comprising monomers of an alkyl(meth)acrylate which may be the same as or different than that of any previous stage, a vinyl aromatic which may be the same as or different than that of any previous stage, and alkyl(meth)acrylate/vinyl aromatic copolymer which may be the same as or different than that of any previous stage, or a combination of any of the foregoing monomers, and optionally, units derived from a cross-linking agent or agents, units which serve as a graft-linking agent or agents, units derived from a cross-linking agent or agents, and units from the same or a different agent or agents which serve as a graft-linking agent or agents, or a combination of any of the foregoing units; and (iii) a polymeric final graft stage graft polymerized in the presence of any previous stages, comprising monomers of an alkyl(meth)acrylate which may be the same as or different than that of any previous stage, a vinyl aromatic which may be the same as or different than that of any previous stage, an alkyl (meth)acrylate/vinyl aromatic copolymer which may be the same as or different than that of any previous stage, or a combination of any of the foregoing monomers, and optionally, units derived from a cross-linking agent or agents, units which serve as a graft-linking agent or agents, units derived from a cross-linking agent or agents and units from the same or a different agent or agents which serve as a graft-linking agent or agents, or a combination of any of the foregoing units; wherein the weight ratio of alkyl (meth)acrylate in all graft stages combined to vinyl aromatic in all graft stages combined is at least 1.2:1.

Additionally, modified vinyl chloride polymers or copolymers which include an impact modifying, yellowing index improving amount of the multi-stage rubber-based resin compositions described above are contemplated by the present invention.

Another aspect of the present invention contemplates a process for producing a multi-stage rubber-based composition comprising the steps of (a) providing a polymeric substrate stage by the polymerization of a conjugated diolefin-based monomer, optionally other monomers copolymerizable therewith, and optionally units derived from a cross-linking agent or agents; and (b) graft polymerizing in the presence of the substrate stage, at least one polymeric graft stage comprising monomers of an alkyl(meth)acrylate, a vinyl aromatic, an alkyl (meth)acrylate/vinyl aromatic copolymer or a combination of any of the foregoing monomers, and optionally, units derived from a cross-linking agent or agents, units derived from a cross-linking agent or agents and units from the same or a different agent or agents which serve as a graft-linking agent or agents, or a combination of any of the foregoing units; wherein the weight ratio of alkyl (meth)acrylate in all graft stages combined to vinyl aromatic in all graft stages combined is at least 1.2:1; to yield a multi-stage rubber-based resin composition.

The process can further comprise steps (c) isolating the multi-stage rubber-based resin composition and/or (d) combining an impact modifying, yellowness index improving amount of the multi-stage rubber-based resin composition with a vinyl chloride polymer or copolymer.

DETAILED DESCRIPTION OF THE INVENTION

The multi-stage rubber-based resin compositions of the present invention belong to a group of graft copolymers generally termed MBS-type (methacrylate-butadiene-styrene) resins.

The rubber latex substrate may comprise either a homopolymer of a conjugated diolefin, preferably butadiene, or a conjugated diolefin-based copolymer, again preferably a butadiene-based copolymer, having at least 40 parts by weight of butadiene-based monomer upon 100 parts by weight of the entire substrate polymer.

Monomers suitable for polymerization with the conjugated diolefin and preferably with butadiene, include alkenyl aromatic compounds and preferably vinyl aromatic compounds such as styrene, divinylbenzene, alpha-methyl styrene, vinyl toluene, hydrogenated styrene; lower ($C_2$–$C_{12}$) alkyl acrylates such as ethyl acrylate, n-propyl acrylate, n-butyl acrylate, 2-methylbutyl acrylate, 3-methylbutyl acrylate, amyl acrylate, n-hexyl acrylate, 2-ethylhexyl acrylate; lower ($C_2$–$C_{12}$) alkyl(meth)acrylates; acrylonitriles; olefins; and the like; or a combination of any of the foregoing.

The substrate can also include one or more units derived from a cross-linking agent or agents. The cross-linking agents generally are not incorporated in their entirety into the final product, but only units which are derived therefrom are incorporated. Cross-linking is described as more than one branching to link together a polymer chain within its own polymerization state. Suitable cross-linking agents include divinylbenzene; di(meth)acrylates; diacrylates such as the diacrylate of mono-, di- or polyethylene glycol; their (meth)acrylates; divinyl sulfide; divinyl ether; vinyl acrylate; vinyl(meth)acrylate; trivinylbenzene; trimethylolpropane; tri(meth)acrylate; triallyl cyanurate and triallyl isocyanurate.

Preferably, the substrate will comprise a copolymer of butadiene and styrene and most preferably a terpolymer of butadiene, styrene, and divinylbenzene. Although the relative amounts of the monomers which comprise the copolymeric substrate may vary, the butadiene component will typically comprise from about 30 to 100 parts by weight, the styrene component will comprise from 0 to about 70 parts by weight, and the divinylbenzene component will comprise from 0 to about 5 parts by weight based upon 100 parts by weight of butadiene, styrene, and divinylbenzene combined. Particularly, the copolymer substrate will comprise from about 50 to about 90 parts by weight of butadiene, from about 10 to about 50 parts by weight of styrene, and from 0 to about 5 parts by weight of divinylbenzene on the same basis, and most preferably, from about 65 to about 85 parts by weight of butadiene, from about 15 to about 35 parts by weight of styrene, and from about 0.5 to about 2.0 parts by weight of divinylbenzene on the same basis.

The substrate can be prepared by any method known in the art including emulsion polymerization, and preferably is prepared by aqueous emulsion polymerization. The emulsion polymerization is typically conducted in the presence of at least one free radical initiator and at least one emulsifier.

Suitable free radical initiators include, but are not limited to, organic peroxides such as cumyl hydroperoxide, diisopropylbenzene hydroperoxide, tertiarybutyl hydroperoxide, benzoyl peroxide, lauroyl peroxide, hydrogen peroxide, and persalts such as ammonium persulfate and perborate. The free radical initiators may optionally be associated with reducing agents such as sodium formaldehydesulfoxylate, sodium metabisulfite, aliphatic amines or polyamines, mercaptans, ferrous sulfates, and sucrose. Typically, free radical initiators are added in amounts ranging from about 0.01 percent to 5 percent by weight based upon the total weight of the monomer or monomers reacted.

Suitable emulsifiers include, but are not limited to, alkali metal salts of fatty acids, alkyl sulfonic acids, alkylaryl sulfonic acids, alkylsulfosuccinic acids, and dresinic acids, i.e. an acid constituent of a resin which is insoluble in water but soluble in organic solvents. Typically, emulsifiers are added in amounts ranging from about 0.5 percent to about 5 percent by weight of the monomer or monomers to be reacted.

The substrate polymerization is generally carried out at temperatures between 5° C. and 90° C., and monomers can be added simultaneously, sequentially, or continuously.

The cross-linking in the substrate can be of varying degrees. If a high degree of cross-linking is desired, one or more cross-linking monomers can be added at any point of the polymerization. If a low degree of cross-linking is desired, a chain limiter such as a alkyl mercaptan may be added in an amount ranging from about 0.01 percent to 1.0 percent by weight in relation to the weight of the monomers.

The substrate latex can be used in an unagglomerated form or in an agglomerated form. Agglomeration enlarges a certain quantity of substrate particles by a process different than polymerization. Suitable agglomeration processes include the application of high pressure; the action of freeze-thawing; the modification of pH value, i.e. with hydrochloric acid, sulfuric acid, or the like; the addition of water soluble electrolyte or the addition of colloids such as polyvinyl alcohols, polymethyl ether or polyoxyethylene in amounts between 0.001 percent and 2 percent by weight of the polymer or copolymer substrate and preferably between 0.002 percent and 0.5 percent on the same basis. If the substrate is of the agglomerated type, preferably from about 10 percent to about 80 percent is agglomerated. Preferably, the substrate particles have a volume average mean diameter ranging from about 60 nm to about 400 nm.

The (meth)acrylate monomers suitable for use in any graft stage are preferably alkyl(meth)acrylate monomers and most preferably lower ($C_2$–$C_{12}$) alkyl (meth)acrylates such as methyl (meth)acrylate, ethyl (meth)acrylate, propyl (meth)-acrylate, and butyl (meth)acrylate and particularly methyl (meth)acrylate.

Vinyl aromatic monomers suitable for use in any graft stage include styrene, divinylbenzene, alpha-methyl styrene, vinyl toluene, vinyl naphthalene, halogenated styrene, and preferably styrene.

The (meth)acrylate constituents and the vinyl aromatic constituents of the (meth)acrylate/vinyl aromatic copolymers suitable for graft stages are as above. Typically, the copolymer will be a methyl (meth)acrylate/styrene copolymer, and preferably the ratio of methyl (meth)acrylate to styrene in the copolymer when found in an intermediate stage will range from about 1:2 to about 2:1.

Preferably, the alkyl (meth)acrylate monomer in all graft stages comprises methyl (meth)acrylate; preferably, the vinyl aromatic monomer in all graft stages comprises styrene. If a methyl (meth)acrylate/vinyl aromatic copolymer is to be grafted in any graft stages, preferably it will comprise a methyl (meth)acrylate/styrene copolymer.

It is necessary in all instances and irrespective of the number of graft stages present, that monomers of both a (meth)acrylate and a vinyl aromatic, whether as individual graft components or as components of a graft copolymer, are present in the total graft stages combined. It is not necessary that each is present in any individual graft stage, however, unless there is only one graft stage. Importantly, the weight ratio of (meth)acrylate in all graft stages combined to vinyl aromatic in all graft stages combined must be at least 1.2:1, preferably at least 1.5:1, and most preferably at least 2.0:1.

The inclusion of one, two, three or more graft stages will provide a balance of impact and yellowness properties. Preferably, the graft stages will comprise a first graft stage, one intermediate graft stage, and a final graft stage. Most preferably, the graft stages of the multi-stage rubber-based graft polymer of the present invention will include a first graft stage of methyl(meth-)acrylate, an intermediate graft stage of methyl(meth)acrylate/styrene co-polymer, and a final graft stage of either methyl (meth)acrylate or styrene.

Although the amounts of each graft stage may vary, preferably the first graft stage will comprise from about 20 to about 100 parts by weight, the intermediate graft stage(s) will comprise from 0 to about 50 parts by weight, and the final graft stage will comprise from 0 to about 80 parts by weight based upon 100 parts by weight of all graft stages combined. Most preferably, the first graft stage will comprise from about 35 to about 65 parts by weight, the intermediate graft stage(s) and the final graft stage will comprises from about 35 to about 65 parts by weight based upon 100 parts by weight of all graft stages combined.

Cross-linking agents also useful in the graft stages are as described above and may or may not be present. They may be added as desired and as described above with respect to the substrate.

Graft-linking agents may be added similarly and include allyl (alkyl)acrylates, triallyl cyanurate and triallyl isocyanurate. Again, graft-linkers generally are not incorporated in their entirety into the final product, but only units which serve as graft-linking agents are incorporated. Grafting is described as one branching for subsequent polymerization. Certain graft-linking agents may serve also as cross-linking agents and therefore as a source of both types of units.

Typically, production of the multi-stage rubber-based resin composition will comprise the steps of (a) providing a polymeric substrate stage by the polymerization of a conjugated diolefin-based monomer, optionally other monomers copolymerizable therewith, and optionally units derived from a cross-linking agent or agents and; (b) graft polymerizing in the presence of the substrate stage, at least one polymeric graft stage graft comprising monomers of a (meth)acrylate and preferably an alkyl(meth)acrylate, a vinyl aromatic, a (meth)acrylate/vinyl aromatic copolymer and preferably an alkyl(meth)acrylate/vinyl aromatic copolymer or a combination of any of the foregoing monomers, and optionally, units derived from a cross-linking agent or agents, units which serve as a graft-linking agent or agents, units derived from a cross-linking agent or agents and units from the same or a different agent or agents which serve as a graft-linking agent or agents, or a combination of any of the foregoing units; wherein the weight ratio of (meth)acrylate and preferably alkyl (meth)acrylate in all graft stages combined to vinyl aromatic in all graft stages combined is at least 1.2:1. Most preferably, step (b) will comprise the steps (i) graft polymerizing in the presence of the substrate stage, a polymeric first graft stage comprising monomers of an alkyl(meth)acrylate, a vinyl aromatic which may be the same as or different than that of the substrate stage, an alkyl(meth)acrylate/vinyl aromatic copolymer or a combination of any of the foregoing monomers, and optionally, units derived from a cross-linking agent or agents, units which serve as a graft-linking agent or agents, units derived from a cross-linking agent or agents and units from the same or a different agent or agents which serve as a graft-linking agent or agents, or a combination of any of the foregoing units; optionally, (ii) graft polymerizing in the presence of any previous stages, one or more polymeric intermediate graft stages, each intermediate graft stage independently comprising monomers of an alkyl(meth)acrylate which may be the same as or different than that of any previous stage, a vinyl aromatic which may be same as or different than that of any previous stage, an alkyl(meth)acrylate/vinyl aromatic copolymer which may be the same as or different than that of any previous stage, or a combination of any of the foregoing monomers, and optionally, units derived from a cross-linking agent or agents, units which serve as a graft-linking agent or agents, units derived from a cross-linking agent or agents and units from the same or a different agent or agents which serve as a graft-linking agent or agents, or a combination of any of the foregoing units; and (iii) graft polymerizing in the presence of any previous stages, a polymeric final graft stage comprising monomers of an alkyl (meth)acrylate which may be the same as or different than that of any previous stage, a vinyl aromatic which may be the same as or different than that of any previous stage, an alkyl (meth)acrylate/vinyl aromatic copolymer which may be the same as or different than that of any previous stage, or a combination of any of the foregoing monomers, and optionally, units derived from a cross-linking agent or agents, units which serve as a graft-linking agent or agents, units derived from a cross-linking agent or agents and units from the same or a different agent or agents which serve as a graft-linking agent or agents, or a combination of any of the foregoing units; wherein the weight ratio of alkyl (meth)acrylate in all graft stages combined to vinyl aromatic in all graft stages combined is at least 1.2:1; to yield the multi-stage rubber-based resin composition. The process may further comprise step (c) wherein the multi-stage rubber-based composition is isolated and/or step (d) wherein an impact modifying, yellowness index modifying amount of the resultant multi-stage rubber-based modifier is combined with a vinyl chloride polymer or copolymer.

Grafting of any graft stage is also done by any method known to those of ordinary skill in the art, preferably by emulsion techniques and most preferably by an aqueous emulsion technique similar to that described above. All grafting is done at temperatures ranging from about 0° C. to about 100° C.

Initiators may be useful in the grafting process and may be the same or different in each graft stage. These may include one or more persalts and preferably organic peroxides, possibly combined with organic or mineral reducing agents, all as described above. The initiator will be present in an amount ranging from about 0.01 percent to about 4 percent by weight based upon the weight of the graft monomers being grafted either in the particular step or in total. The initiator may be introduced continuously, once at the beginning of all grafting, or at the beginning of each graft stage. Similarly, if a reducing agent is to be used, it may be added continuously, once at the beginning of all grafting or at the beginning of each graft stage.

A water soluble electrolyte such as potassium chloride, sodium chloride, or sodium sulfate may be added to the system to agglomerate the multi-stage rubber-based graft polymer particles.

The multi-stage rubber-based polymer can be used as is in the form of a latex, can be separated by atomization, or can be coagulated by addition of calcium chloride, alum, or mineral acid, followed by filtration under vacuum, washing and drying, or heat treating, dehydrating, washing and drying to yield a powder.

The MBS-type aqueous latex of the present invention can be obtained as a powder by adding an aqueous solution of a salt or an acid to the latex to coagulate the graft polymer.

Typically, the substrate stage comprises from about 30 to about 90 parts by weight and all graft stages combined comprise from about 70 to about 10 parts by weight based upon 100 parts by weight of substrate stage and all graft stages combined. Most preferably, the substrate comprises from about 50 to about 80 by weight and all graft stages combined comprise from about 20 to about 50 parts by weight based upon 100 parts by weight of substrate stage and all graft stages combined.

The MBS-type resin compositions of the present invention are particularly useful when used to modify vinyl chloride resins. The vinyl chloride resin may be a homopolymer of vinyl chloride or a copolymer of vinyl chloride with a minor proportion of one or more monomers copolymerizable with vinyl chloride. Vinyl chloride in such copolymers typically comprises, on a weight basis, at least about 80 parts by weight of the copolymer and the copolymerizable monomer comprises up to about 20 parts by weight based upon 100 parts by weight of total copolymer.

A wide variety of copolymerizable monomers may be used to prepare such vinyl chloride copolymers. These include vinylidene chloride; vinyl acetate and vinyl stearate; acrylic and methacrylic acid esters; olefins, such as ethylene, propylene, isobutylene, and the like; vinyl alkyl ethers such as vinyl isobutyl ether, vinyl lauryl ether and vinyl cetyl ether; acrylic acid and methacrylic acid; acrylonitrile and methacrylonitrile; diethyl fumarate; maleic anhydride; dimethyl itaconate; N-vinyl carbazole; or mixtures thereof. Further, the vinyl chloride resins may include halogenated polyvinyl chloride and the like.

Methods for the preparation of vinyl chloride polymers are well known in the art. See, for example, Kirk-Othmer, *Encyclopedia of Chemical Technology*, 2d Ed., Interscience Publishers, Vol. 21, pages 369–412 (1970).

Preferred vinyl chloride polymers suitable for use in the present invention have a relative viscosity ranging from about 1.40 to about 2.80 as measured at a concentration of 1 gram per 100 grams of cyclohexanone at 25° C. Polyvinyl chloride homopolymer resins falling within this relative viscosity range are particularly preferred.

Typically, the vinyl chloride polymer or copolymer component will comprise from about 1 to about 99 parts by weight and the multi-stage rubber-based resin composition modifier will comprise from about 99 to about 1 part by weight based upon 100 parts by weight of vinyl chloride polymer or copolymer and modifier combined. Preferably, the vinyl chloride polymer or copolymer will comprise from about 65 to about 98 parts by weight and the modifier will comprise from about 2 to about 35 parts by weight based upon 100 parts by weight of the components combined, and most preferably, the vinyl chloride polymer or copolymer will comprise from about 85 to about 95 parts by weight the modifier will comprise about 15 to about 5 parts by weight on the same basis.

Conventional processing for mixing thermoplastic polymers can be used for the manufacture of compositions within the scope of the present invention. For example, the compositions can be manufactured using any suitable mixing equipment, cokneaders or extruders under conditions known to one of ordinary skill in the art.

Yellowness index improvement is indicated by a reduction of yellowness index when compared with vinyl chloride polymers or copolymers modified with multi-stage rubber-based resin compositions while maintaining clarity wherein the weight ratio of (meth)acrylate in all graft stages combined to vinyl aromatic in all graft stages combined is less than 1.2:1.

Special mention is made of blends comprising the compositions of the present invention. Additionally, the multi-stage rubber-based compositions or the modified vinyl chloride compositions of the present invention may be molded, calendered, extruded, blow molded, or thermoformed into articles by conventional methods known to one of ordinary skill in the art.

Additionally, additives such as antioxidants, heat stabilizers, reinforcing fillers, plasticizers, flame retardants, pigments, and combinations thereof may be added to the compositions of the present invention.

DESCRIPTION OF THE PREFERRED EMBODIMENTS

The following examples illustrate the invention without limitation. All parts given are by weight unless otherwise indicated. Impact strengths are reported as ¼" notched Izod (NI) according to ASTM D-256 at 23° C. unless otherwise specified. Fracture resistances are also indicated by ductile/brittle ratio. Yellowing is measured by yellowness index (YI), and clarity is defined as high light transmittance in the visible light range, where total transmittance (% trans) is 76% or greater.

A single slash is used between monomers of a single stage, and a double slash or a hyphen is used as a short hand method of indicating separation between stages. The first stage to be polymerized is written before the double slash or hyphen, and subsequent stages are written subsequently.

The following abbreviations are used in accordance with the following Examples and Tables:
B = butadiene
CHP = cumene hydroperoxide
DVB = divinylbenzene
$FeSO_4.7H_2O$ = ferrous sulfate heptahydrate
MMA = methyl (meth)acrylate
Na3.EDTA = tri-sodium salt of ethylenediaminetetraacetic acid
PVC = poly(vinyl chloride)
S = styrene
SFS = sodium formaldehyde sulfoxylate Numbers in parenthesis following the abbreviations indicate parts by weight of monomers charged for polymerization.

PROCEDURE A

An autoclave were charged with 50.0 to 85.0 parts of butadiene, 15.0 to 50.0 parts of styrene, 0 to 3.0 parts of divinylbenzene, 0.2 to 0.8 part of potassium persulfate, 0.2 to 1.5 parts of tert-dodecyl mercaptan, 0.4 to 2.5 parts of oleic acid or lauric acid, 0.4 to 3.0 parts of potassium hydroxide, and 150.0 to 200.0 parts of deionized water to prepare a substrate. The exact amount of each ingredient was dependent upon the S/B/DVB ratio and the reactor's calibration curve to achieve the desired parameters of particle size, refractive index, swelling index and stability as known to those of ordinary skill in the art.

The polymerization was conducted at 50° C. to 70° C. for 11 to 24 hours to yield a substrate latex.

Additional soap or electrolyte was post-added for extra stability prior to subsequent grafting.

PROCEDURE B

An autoclave was charged with 75.5 parts of butadiene, 23.0 parts of styrene, 1.5 parts of divinylbenzene, 0.05 parts of a catalyst dispersion (azobisisobutyronitrile as the initiator which is stirred in an aqueous phase with a xanthan type gum used as an emulsifier and dispersing aid), 3.0 parts of potassium oleate, and 150.0 parts of deionized water.

The polymerization was conducted at 60° C. and then at 70° C. for approximately 15 hours to yield a substrate latex.

PROCEDURE C

An autoclave was charged with 71.0 parts of butadiene, 27.5 parts of styrene, 1.5 parts of divinylbenzene, 0.05 part of a catalyst dispersion (azobisisobutyronitrile as the initiator which is stirred in an aqueous phase with a xanthan type gum used as an emulsifier and dispersing aid), 3.0 parts of potassium oleate, and 150.0 parts of deionized water.

The polymerization was conducted at 60° C. and then at 70° C. for approximately 15 hours to yield a substrate latex.

PROCEDURE D 100.0 parts of styrene/butadiene (wt ratio S/B of 25:75) were emulsified in 145.0 parts of deionized water by using 3.5 parts of potassium oleate with 0.1 part of sodium pyrophosphate and 0.1 part of tris-sodium salt of EDTA. Polymerization was initiated by 0.1 part of potassium persulfate at about 55° C. Potassium oleate was added incrementally during the course of polymerization while the temperature was raised to 70° C.

The latex was then agglomerated to a mean diameter of 200 nm with broad particle size distribution to yield a substrate latex.

PROCEDURE E

A PVC Masterbatch I was prepared by mixing 100.0 parts of poly(vinyl chloride) resin (B221-RV of 1.77 —Oxy Chem—Berwyn, Pa.), 2.0 parts of stabilizer (Argus Mark 1414A), 2.0 parts of processing aid (K-120N, Rohm & Haas, Philadelphia, Pa.), 1.3 parts of lubricant (0.4 parts of "E" Wax—Hoechst—Somerville, N.J.), 0.5 part of XL 165 —Hoechst, 0.4 part of Loxiol G60 —Henkel—Cincinnati, Ohio) and 0.075 part of toner Masterbatch (99.25 wt % B221 PVC, 0.75 wt % Calco oil Violet ZIRS).

PROCEDURE F

A PVC Masterbatch II was prepared by mixing 100.0 parts of poly(vinyl chloride) resin (Oxy 185 —Oxy Chem), 2.0 parts of stabilizer (Argus Mark 1414A), 2.0 parts of processing aid (K-120N, Rohm & Haas), 1.3 parts of lubricant (0.4 parts of "E" Wax Hoechst), 0.5 part of XL 165 —Hoechst, 0.4 part of Loxiol G60 —Henkel) and 0.075 part of toner Masterbatch (99.25 wt % B221 PVC, 0.75 wt % Calco oil Violet ZIRS).

EXAMPLE 1

(B(46.15)/S(17.87)/DVB(0.98)//MMA(22)/S(13))

A substrate latex was prepared according to the method of Procedure A. 65.0 parts based on solids of the substrate latex were then diluted with 156.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 35.0 parts of methyl (meth)acrylate/styrene comonomer (22:13) were fed in over 54 minutes, and 0.3 part of cumene hydroperoxide was fed in over 59 minutes. The graft polymerization was continued for one additional hour after completion of the addition to yield a MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

COMPARATIVE EXAMPLE 2*

(B(46 15)/S(17.87)/DVB(0.98)//MMA(17.5)/S(17.5))

A substrate latex was prepared according to the method of Procedure A. 65.0 parts based on solids of the substrate latex were then diluted with 156.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 35.0 parts of methyl (meth)acrylate/styrene comonomer (17.5:17.5) were fed in over minutes, and 0.3 part of cumene hydroperoxide was fed in over 59 minutes. The graft polymerization was continued for one additional hour after completion of the addition to yield a MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

EXAMPLE 3

(B(49.07)/S(14.95)/DVB(0.98)//MMA(22)/S(13))

A substrate latex was prepared according to the method of Procedure B. 65.0 parts based on solids of the substrate latex were then diluted with 156.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 35.0 parts of methyl (meth)acrylate/styrene comonomer (22:13) were fed in over 54 minutes, and 0.3 part of cumene hydroperoxide was fed in over minutes. The graft polymerization was continued for one additional hour after completion of the addition to yield a MBS latex.

1.0 part of a stabilizer package of dialkylphenol sulfide, antioxidant and dilaurylthiodipropionate was added to the MBS latex. This mixture was coagulated by sulfuric acid, dehydrated an dried.

The MBS composition is summarized in Table 1.

EXAMPLE 4

(B(46.15)/S(17.87)/DVB(0.98)//MMA(22)/S(13))

A substrate latex was prepared according to the method of Procedure C. 65.0 parts based on solids of the substrate latex were then diluted with 156.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 35.0 parts of methyl (meth)acrylate/styrene comonomer (22:13) were fed in over 54 minutes, and 0.3 part of cumene hydroperoxide was fed in over minutes. The graft polymerization was continued for one additional hour after completion of the addition to yield a MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

EXAMPLE 5

(B(48.75)/S(16.25)//MMA(22)/S(13))

A substrate latex was prepared according to the method of Procedure D. 65.0 parts based on solids of the substrate latex were then diluted with 156.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 35.0 parts of methyl (meth)acrylate/styrene comonomer (22:13) were fed in over 54 minutes, and 0.3 part of cumene hydroperoxide was fed in over 59 minutes. The graft polymerization was continued for one additional hour after completion of the addition to yield a MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

EXAMPLE 6

(B(42.6)/S(16.5)/DVB(0.9)//MMA(26.7)/S(13.3))

A substrate latex was prepared according to the method of Procedure A. 60.0 parts based on solids of the substrate latex were then diluted with 162.0 parts of deionized water and adjusted to a pH of 9.5. An activator package (0.075 part of sodium formaldehyde sulfoxylate, 0.225 part of the tris-sodium salt of ethylenediaminetetraacetic acid, and 0.0075 part of ferrous sulfate heptahydrate) was added.

Five minutes later, 26.7 parts of methyl (meth)acrylate were fed in over 25 minutes, and 0.1 part of cumene hydroperoxide was fed in over 30 minutes. This first graft stage polymerization continued at 170° F. for 30 minutes.

The second graft stage polymerization was then commenced by adding 0.075 part of sodium formaldehyde sulfoxylate followed five minutes later by the addition of 13.3 parts of styrene fed over 25 minutes, and 0.1 part of cumene hydroperoxide fed over 30 minutes. The graft polymerization was continued for one additional hour after completion of the addition to yield an MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

EXAMPLE 7

(B(46.15)/S(17.87)/DVB(0.98)//MMA(23.3)//S(11.7))

A substrate latex was prepared according to the method of Procedure A 65 0 parts based on solids of the substrate latex solid were then diluted with 162.0 parts of deionized water and adjusted to a pH of 9.5. An activator package (0.075 part of sodium formaldehyde sulfoxylate, 0.225 part of the tris-sodium salt of ethylenediaminetetraacetic acid, and 0.0075 part of ferrous sulfate heptahydrate) was added.

Five minutes later, 23.3 parts of methyl (meth)acrylate were fed in over 25 minutes, and 0.1 part of cumene hydroperoxide was fed in over 30 minutes. This first graft stage polymerization continued at 170° F for 30 minutes.

The second graft stage polymerization was then commenced by adding 0.075 part of sodium formaldehyde sulfoxylate followed five minutes later by the addition of 11.7 parts of styrene fed over 25 minutes, and 0.1 part of cumene hydroperoxide fed over 30 minutes. The graft polymerization was continued for one additional hour after completion of the addition to yield an MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

COMPARATIVE EXAMPLE 8*

(B(46.15)/S(17.87)/DVB(0.98)//MMA(17.5)//S(17.5))

A substrate latex was prepared according to the method of Procedure A. 65.0 parts based on solids of the substrate latex were then diluted with 162.0 parts of deionized water and adjusted to a pH of 9.5. An activator package (0.075 part of sodium formaldehyde sulfoxylate, 0.225 part of the tris-sodium salt of ethylenediaminetetraacetic acid, and 0.0075 part of ferrous sulfate heptahydrate) was added.

Five minutes later, 17.5 parts of methyl (meth)acrylate were fed in over 25 minutes, and 0.1 part of cumene hydroperoxide was fed in over 30 minutes. This first graft stage polymerization continued at 170° F. for 30 minutes.

The second graft stage polymerization was then commenced by adding 0.075 part of sodium formaldehyde sulfoxylate followed five minutes later by the addition of 17.5 parts of styrene fed over 25 minutes, and 0.2 part of cumene hydroperoxide fed over 30 minutes. The graft polymerization was continued for one additional hour after completion of the addition to yield an MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

COMPARATIVE EXAMPLE 9*

(B(46.15)/S(17.87)/DVB(0.98)//MMA(17.5)//S(17.5))

A substrate latex was prepared according to the method of Procedure C. 65.0 parts based on solids of the substrate latex were then diluted with 162.0 parts of deionized water and adjusted to a pH of 9.5. An activator package (0.075 part of sodium formaldehyde sulfoxylate, 0.225 part of the tris-sodium salt of ethylenediaminetetraacetic acid, and 0.0075 part of ferrous sulfate heptahydrate) was added.

Five minutes later, 17.5 parts of methyl (meth)acrylate were fed in over 25 minutes, and 0.1 part of cumene hydroperoxide was fed in over 30 minutes. This first graft stage polymerization continued at 170° F. for 30 minutes.

The second graft stage polymerization was then commenced by adding 0.075 part of sodium formaldehyde sulfoxylate followed five minutes later by the addition of 17.5 parts of styrene fed over 25 minutes, and 0.2 part of cumene hydroperoxide fed over 30 minutes. The graft polymerization was continued for one additional hour after completion of the addition to yield an MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

COMPARATIVE EXAMPLE 10*

(B(46.15)/S(17.87)/DVB(0.98)//S(17.5)//MMA(17.5))

A substrate latex was prepared according to the method of Procedure A. 65.0 parts based on solids of the substrate latex were then diluted with 162.0 parts of deionized water and adjusted to a pH of 9.5. An activator package (0.075 part of sodium formaldehyde sulfoxylate, 0.225 part of the tris-sodium salt of ethylenediaminetetraacetic acid, and 0.0075 part of ferrous sulfate heptahydrate) was added.

Five minutes later, 17.5 parts of styrene were fed in over 25 minutes, and 0.1 part of cumene hydroperoxide was fed in over 30 minutes. This first graft stage polymerization continued at 170° F. for 30 minutes.

The second graft stage polymerization was then commenced by adding 0.075 part of sodium formaldehyde sulfoxylate followed five minutes later by the addition of 17.5 parts of methyl (meth)acrylate fed over 25 minutes and 0.2 part of cumene hydroperoxide fed over 30 minutes. The graft polymerization was continued for one additional hour after completion of the addition to yield an MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

EXAMPLE 11

(B(49.7)/S(19.25)/DVB(1.05)//MMA(20.0)//S(10.0))

A substrate latex was prepared according to the method of Procedure A. 70.0 parts based on solids of the substrate latex were then diluted with 162.0 parts of deionized water and adjusted to a pH of 9.5. An activator package (0.075 part of sodium formaldehyde sulfoxylate, 0.225 part of the tris-sodium salt of ethylenediaminetetraacetic acid, and 0.0075 part of ferrous sulfate heptahydrate) was added.

Five minutes later, 20.0 parts of methyl (meth)acrylate were fed in over 25 minutes, and 0.1 part of cumene hydroperoxide was fed in over 30 minutes. This first graft stage polymerization continued at 170° F. for 30 minutes.

The second graft stage polymerization was then commenced by adding 0.075 part of sodium formaldehyde sulfoxylate followed five minutes later by the addition of 10.0 parts of styrene fed over 25 minutes and 0.1 part of cumene hydroperoxide fed over 30 minutes. The graft polymerization was continued for one additional hour after completion of the addition to yield an MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

EXAMPLE 12

(B(49.7)/S(19.25)/DVB(1.05)//MMA(20.0)//S(10.0))

A substrate latex was prepared according to the method of Procedure A. 70.0 parts based on solids of the substrate latex were then diluted with 162.0 parts of deionized water and adjusted to a pH of 9.5. An activator package (0.075 part of sodium formaldehyde sulfoxylate, 0.225 part of the tris-sodium salt of ethylenediaminetetraacetic acid, and 0.0075 part of ferrous sulfate heptahydrate) was added.

Five minutes later, 20.0 parts of methyl (meth)acrylate were fed in over 25 minutes, and 0.1 part of cumene hydroperoxide was fed in over 30 minutes. This first graft stage polymerization continued at 170° F. for 30 minutes.

The second graft stage polymerization was then commenced by adding 0.075 part of sodium formaldehyde sulfoxylate followed five minutes later by the addition of 10.0 parts of styrene fed over 25 minutes and 0.1 part of cumene hydroperoxide fed over 30 minutes. The graft polymerization was continued for one additional hour after completion of the addition to yield an MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

EXAMPLE 13

(B(49.7)/S(19.25)/DVB(1.05)//MMA(20.0)//S(10.0))

A substrate latex was prepared according to the method of Procedure A. 70.0 parts based on solids of the substrate latex were then diluted with 162.0 parts of deionized water and adjusted to a pH of 9.5. An activator package (0.075 part of sodium formaldehyde sulfoxylate, 0.225 part of the tris-sodium salt of ethylenediaminetetraacetic acid, and 0.0075 part of ferrous sulfate heptahydrate) was added.

Five minutes later, 20.0 parts of methyl (meth)acrylate were fed in over 25 minutes, and 0.1 part of cumene hydroperoxide was fed in over 30 minutes. This first graft stage polymerization continued at 170° F for 30 minutes.

The second graft stage polymerization was then commenced by adding 0.075 part of sodium formaldehyde sulfoxylate followed five minutes later by the addition of 10.0 parts of styrene fed over 25 minutes and 0.1 part of cumene hydroperoxide fed over 30 minutes. The graft polymerization was continued for one additional hour after completion of the addition to yield an MBS latex.

1.0 part of a stabilizer package of dialkylphenol sulfide, antioxidant and dilaurylthiodipropionate was added to the MBS latex. This mixture was coagulated by sulfuric acid, dehydrated and dried.

The MBS composition is summarized in Table 1.

EXAMPLE 14

(B(46.15)/S(17.87)/DVB(0.98)//MMA(16.4)//-MMA(2.7)/S(2.3)//S(13.6))

A substrate latex was prepared according to the method of Procedure A. 65.0 parts based on solids of the substrate latex were then diluted in 182.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 16.4 parts of methyl (meth)acrylate were fed in over 40 minutes, and 0.1 part of cumene hydroperoxide was fed in over 45 minutes while the temperature was gradually raised from 136° F. to 170° F. This first graft stage polymerization continued for 30 additional minutes.

The second stage polymerization was commenced by adding 0.075 part of sodium formaldehyde sulfoxylate followed five minutes later by the addition of 5.0 parts of methyl (meth)acrylate and styrene comonomers (2.7:2.3) over 25 minutes and 0.05 part of cumene hydroperoxide over 30 minutes. The second graft stage polymerization continued for 15 additional minutes.

The final (third) graft stage polymerization was commenced by adding 0.075 part of sodium formaldehyde sulfoxylate followed five minutes later by the addition of 13.6 parts of styrene over 25 minutes and 0.15 part of cumene hydroperoxide over 30 minutes. The final (third) graft stage polymerization continued for 60 additional minutes to yield an MBS latex.

1.0 part of a stabilizer package of dialkylphenol sulfide, antioxidant and dilaurylthiodipropionate was added to the MBS latex. The mixture was coagulated by sulfuric acid, dehydrated and dried.

The MBS composition is summarized in Table 1.

COMPARATIVE EXAMPLE 15*

(B(46.15)/S(17.87)/DVB(0.98)//MMA(15.0)//-MMA(2.5)/S (2.5)//S (15.0))

A substrate latex was prepared according to the method of Procedure A. 65.0 parts based on solids of the substrate latex were then diluted in 182.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 15.0 parts of methyl (meth)acrylate were fed in over 40 minutes, and 0.1 part of cumene hydroperoxide was fed in over 45 minutes while the temperature was gradually raised from 136° F. to 170° F. The first graft stage polymerization continued for 30 additional minutes.

The second graft stage polymerization was commenced by adding 0.075 part of sodium formaldehyde sulfoxylate followed five minutes later by the addition of 5.0 parts of methyl (meth)acrylate and styrene comonomers (2.5:2.5) over 25 minutes and 0.05 part of cumene hydroperoxide over 30 minutes. The second graft stage polymerization continued for 15 additional minutes.

The final (third) stage polymerization was commenced by adding 0.075 part of sodium formaldehyde sulfoxylate followed five minutes later by the addition of 15.0 parts of styrene over 25 minutes and 0.15 part of cumene hydroperoxide over 30 minutes. The final (third) graft stage polymerization continued for 60 additional minutes to yield an MBS latex.

1.0 part of a stabilizer package of dialkylphenol sulfide, antioxidant and dilaurylthiodipropionate was added to the MBS latex. The mixture was coagulated by sulfuric acid, dehydrated and dried.

The MBS composition is summarized in Table 1.

EXAMPLE 16

(B(46.15)/S(17.87)/DVB(0.98)//MMA(17.2)//-MMA(2.8)/S(2.2)//S(13.1))

A substrate latex was prepared according to the method of Procedure A. 65.0 parts based on solids of the substrate latex were then diluted in 182.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 17.0 parts of methyl (meth)acrylate were fed in over 40 minutes, and 0.1 part of cumene hydroperoxide was fed in over 45 minutes while the temperature was gradually raised from 136° F. to 170° F. The first graft stage polymerization continued for 30 additional minutes.

The second graft stage polymerization was commenced by adding 0.075 part of sodium formaldehyde sulfoxylate followed five minutes later by the addition of 5.0 parts of methyl (meth)acrylate and styrene comonomers (2.8:2.2) over 25 minutes and 0.05 part of cumene hydroperoxide over 30 minutes. The second graft stage polymerization continued for 15 additional minutes.

The final (third) graft stage polymerization was commenced by adding 0.075 part of sodium formaldehyde sulfoxylate followed five minutes later by the addition of 13.0 parts of styrene over 25 minutes and 0.15 part of cumene hydroperoxide over 30 minutes. The final (third) graft stage polymerization continued for 60 additional minutes to yield an MBS latex.

1.0 part of a stabilizer package of dialkylphenol sulfide, antioxidant and dilaurylthiodipropionate was added to the MBS latex. The mixture was coagulated by sulfuric acid, dehydrated and dried.

The MBS composition is summarized in Table 1.

EXAMPLE 17

(B(46.15)/S(17.87)/DVB(0.98)//MMA(14.1)//-MMA(5.6)/S(4.4)//S(10.9))

A substrate latex was prepared according to the method of Procedure A. 65.0 parts based on solids of the substrate latex were then diluted in 182.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 16.4 parts of methyl (meth)acrylate were fed in over 40 minutes, and 0.1 part of cumene hydroperoxide was fed in over 45 minutes while the temperature was gradually raised from 136° F. to 170° F. The first graft stage polymerization continued for 30 additional minutes.

The second graft stage polymerization was commenced by adding 0.075 part of sodium formaldehyde sulfoxylate followed five minutes later by the addition of 10.0 parts of methyl (meth)acrylate and styrene comonomers (5.6:4.4) over 25 minutes and 0.1 part of cumene hydroperoxide over 30 minutes. The second graft stage polymerization continued for 15 additional minutes.

The final (third) graft stage polymerization was commenced by adding 0.075 part of sodium formaldehyde sulfoxylate followed five minutes later by the addition of 10.9 parts of styrene over 25 minutes and 0.1 part of cumene hydroperoxide over 30 minutes. The final (third) graft stage polymerization continued for 45 additional minutes to yield an MBS latex.

1.0 part of a stabilizer package of dialkylphenol sulfide, antioxidant and dilaurylthiodipropionate was added to the MBS latex. The mixture was coagulated by sulfuric acid, dehydrated and dried.

The MBS composition is summarized in Table 1.

EXAMPLE 18

(B(46.15)/S(17.87)/DVB(0.98)//MMA(17.5)//-MMA(2.9)/S (2.1)//S(12.5))

A substrate latex was prepared according to the method of Procedure A. 65.0 parts based on solids of the substrate latex were then diluted in 182.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 17.5 parts of methyl (meth)acrylate were fed in over 40 minutes, and 0.1 part of cumene hydroperoxide was fed in over 45 minutes while the temperature was gradually raised from 136° F. to 170° F. The first graft stage polymerization continued for 30 additional minutes.

The second graft stage polymerization was commenced by adding 0.075 part of sodium formaldehyde sulfoxylate followed five minutes later by the addition of 5.0 parts of methyl (meth)acrylate and styrene comonomers (2.9:2.1) over 25 minutes and 0.05 part of cumene hydroperoxide over 30 minutes. The second graft stage polymerization continued for 15 additional minutes.

The final (third) graft stage polymerization was commenced by adding 0.075 part of sodium formaldehyde sulfoxylate followed five minutes later by the addition of 12.5 parts of styrene over 25 minutes and 0.15 part of cumene hydroperoxide over 30 minutes. The final (third) graft stage polymerization continued for 60 additional minutes to yield an MBS latex.

1.0 part of a stabilizer package of dialkylphenol sulfide, antioxidant and dilaurylthiodipropionate was added to the MBS latex. The mixture was coagulated by sulfuric acid, dehydrated and dried.

The MBS composition is summarized in Table 1.

EXAMPLE 19

(B(46.15)/S(17.87)/DVB(0.98)/MMA(14.6)//-MMA(5.8)/S (4.2)//S(10.4))

A substrate latex was prepared according to the method of Procedure A. 65.0 parts based on solids of the substrate latex were then diluted in 182.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 14.6 parts of methyl (meth)acrylate were fed in over 40 minutes, and 0.1 part of cumene hydroperoxide was fed in over 45 minutes while the temperature was gradually raised from 136° F. to 170° F. The first graft stage polymerization continued for 30 additional minutes.

The second graft stage polymerization was commenced by adding 0.075 part of sodium formaldehyde sulfoxylate followed five minutes later by the addition of 10.0 parts of methyl (meth)acrylate and styrene comonomers (5.8:4.2) over 25 minutes and 0.1 part of cumene hydroperoxide over 30 minutes. The second graft stage polymerization continued for 15 additional minutes.

The final (third) graft stage polymerization was commenced b adding 0.075 part of sodium formaldehyde sulfoxylate followed five minutes later by the addition of 10.4 parts of styrene over 25 minutes and 0.1 part of cumene hydroperoxide over 30 minutes. The final (third) graft stage polymerization continued for 45 additional minutes to yield an MBS latex.

1.0 part of a stabilizer package of dialkylphenol sulfide, antioxidant and dilaurylthiodipropionate was added to the MBS latex. The mixture was coagulated by sulfuric acid, dehydrated and dried.

The MBS composition is summarized in Table 1.

EXAMPLE 20

(B(49.7)/S(19.25) DVB(1.05)//MMA(15.0)//MMA(5.0)/S(2.5)//S(7.5))

A substrate latex was prepared according to the method of Procedure A. 70.0 parts based on solids of the substrate latex were then diluted in 182.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 15.0 parts of methyl (meth)acrylate were fed in over 40 minutes, and 0.1 part of cumene hydroperoxide was fed in over 45 minutes while the temperature was gradually raised from 136° F. to 170° F. The first graft stage polymerization continued for 30 additional minutes.

The second graft stage polymerization was commenced by adding 0.075 part of sodium formaldehyde sulfoxylate followed five minutes later by the addition of 7.5 parts of methyl (meth)acrylate and styrene comonomers (5.0:2.5) over 25 minutes and 0.1 part of cumene hydroperoxide over 30 minutes. The second graft stage polymerization continued for 15 additional minutes.

The final (third) graft stage polymerization was commenced by adding 0.075 part of sodium formaldehyde sulfoxylate followed five minutes later by the addition of 7.5 parts of styrene over 25 minutes and 0.1 part of cumene hydroperoxide over 30 minutes. The final (third) graft stage polymerization continued for 90 additional minutes to yield an MBS latex.

1.0 part of a stabilizer package of dialkylphenol sulfide, antioxidant and dilaurylthiodipropionate was added to the MBS latex. The mixture was coagulated by sulfuric acid, dehydrated and dried.

The MBS composition is summarized in Table 1.

EXAMPLE 21

(B(49.7)/S(19.25)/DVB(1.05)//MMA(15.0)//-MMA(5.0)/S (2.5)//S(7.5))

Two substrate latexes were prepared according to the method of Procedure A. 35.0 parts based on solids of the first substrate latex and 35.0 parts of the second substrate were then diluted in 182.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 15.0 parts of methyl (meth)acrylate were fed in over 40 minutes, and 0.1 part of cumene hydroperoxide was fed in over 45 minutes while the temperature was gradually raised from 136° F. to 170° F. The first graft stage polymerization continued for 30 additional minutes.

The second graft stage polymerization was commenced by adding 0.075 part of sodium formaldehyde sulfoxylate followed five minutes later by the addition of 7.5 parts of methyl (meth)acrylate and styrene comonomers (2.7:2.3) over 25 minutes and 0.01 part of cumene hydroperoxide over 30 minutes. The second graft stage polymerization continued for 15 additional minutes.

The final (third) graft stage polymerization was commenced by adding 0.075 part of sodium formaldehyde sulfoxylate followed five minutes later by the addition of 7.5 parts of styrene over 25 minutes and 0.1 part of cumene hydroperoxide over 30 minutes. The final (third) graft stage polymerization continued for 60 additional minutes to yield an MBS latex.

1.0 part of a stabilizer package of dialkylphenol sulfide, antioxidant and dilaurylthiodipropionate was added to the MBS latex. The mixture was coagulated by sulfuric acid, dehydrated and dried.

The MBS composition is summarized in Table 1.

EXAMPLE 22

(B(46.15)/S17.87)/DVB(0.98)//MMA(21.6)//S(11.7)/-/MMA (1.7))

A substrate latex was prepared according to the method of Procedure A. 65.0 parts based on solids of the substrate latex were then diluted in 182.0 parts of deionized water and adjusted to a pH of 9.5. An activator package (0.075 part of sodium formaldehyde sulfoxylate, 0.0225 part of the tris-sodium salt of ethylenediaminetetraacetic acid, and 0.0075 part of ferrous sulfate heptahydrate) was added.

Five minutes later, 21.6 parts of methyl (meth)acrylate were fed in over 25 minutes, and 0.1 part of cumene hydroperoxide was fed in over 30 minutes while the temperature was gradually raised from 136° F. to 170° F. The first graft stage polymerization continued for 30 additional minutes.

The second graft stage polymerization was commenced by adding 0.075 part of sodium formaldehyde sulfoxylate followed five minutes later by the addition of 11.7 parts of styrene over 25 minutes and 0.2 part of cumene hydroperoxide over 30 minutes. The second graft stage polymerization continued for 60 additional minutes.

The final (third) graft stage polymerization was commenced by adding 0.075 part of sodium formaldehyde sulfoxylate followed five minutes later by the addition of 1.7 parts of methyl (meth)acrylate over 5 minutes and 0.1 part of cumene hydroperoxide over 10 minutes. The final (third) graft stage polymerization continued for 80 additional minutes to yield an MBS latex.

1.0 part of a stabilizer package of dialkylphenol sulfide, antioxidant and dilaurylthiodipropionate was added to the MBS latex. The mixture was coagulated by sulfuric acid, dehydrated and dried.

The MBS composition is summarized in Table 1.

TABLE 1

| EXAMPLE | 1 | 2* | 3 | 4 | 5 | 6 | 7 | 8* | 9 |
|---|---|---|---|---|---|---|---|---|---|
| Composition | | | | | | | | | |
| Substrate Stage | | | | | | | | | |
| Butadiene | 46.15 | 46.15 | 49.07 | 46.15 | 48.75 | 42.6 | 46.15 | 46.15 | 46.15 |
| Styrene | 17.87 | 17.87 | 14.95 | 17.87 | 16.25 | 16.5 | 17.87 | 17.87 | 17.87 |
| Divinylbenzene | 0.98 | 0.98 | 0.98 | 0.98 | — | 0.9 | 0.98 | 0.98 | 0.98 |
| Particle Mean Diameter Vol. Avg. (nm) | 186 | 186 | 118 | 129 | 200[4] | 126 | 126 | 186 | 129 |
| First Graft Stage | | | | | | | | | |
| MMA | — | | | | | 26.7 | 23.3 | 17.5 | 17.5 |
| S | — | | | | | — | — | — | — |
| MMA/S Total (MMA/S Ratio) | 35 (22/13) | 35 (17.5/17.5) | 35 (22/13) | 35 (22/13) | 35 (22/13) | — | — | — | — |
| MMA/S (MMA/S) Intermediate Graft Stage | | | | | | | | | |
| MMA | — | — | — | — | — | | | | |
| S | — | — | — | — | — | | | | |
| MMA/S Total (MMA/S) | — | — | — | — | — | | | | |
| Final Graft Stage | | | | | | | | | |
| MMA | — | — | — | — | — | — | — | — | — |
| S | — | — | — | — | — | 13.3 | 11.7 | 17.5 | 17.5 |
| MMA/S Total (MMA/S) | — | — | — | — | — | | | | |

TABLE 1-continued

| | | | | | | | | | |
|---|---|---|---|---|---|---|---|---|---|
| Total MMA/S Ratio of Graft Stages | 1.7:1.0 | 1.0:1.0 | 1.7:1.0 | 1.7:1.0 | 1.7:1.0 | 2.0:1.0 | 2.0:1.0 | 1.0:1.0 | 1.0:1.0 |

| EXAMPLE | 10* | 11 | 12 | 13 | 14 | 15* | 16 | 17 | 18 |
|---|---|---|---|---|---|---|---|---|---|
| Composition | | | | | | | | | |
| Substrate Stage | | | | | | | | | |
| Butadiene | 46.15 | 49.7 | 49.7 | 49.7 | 46.15 | 46.15 | 46.15 | 46.15 | 46.15 |
| Styrene | 17.87 | 19.25 | 19.25 | 19.25 | 17.87 | 17.87 | 17.87 | 17.87 | 17.87 |
| Divinylbenzene | 0.98 | 1.05 | 1.05 | 1.05 | 0.98 | 0.98 | 0.98 | 0.98 | 0.98 |
| Particle Mean Diameter Vol. Avg. (nm) | 186 | 126 | 186 | 182 | 182 | 182 | 182 | 182 | 182 |
| First Graft Stage | | | | | | | | | |
| MMA | — | 20.0 | 20.0 | 20.0 | 16.4 | 15.0 | 17.2 | 14.1 | 17.5 |
| S | 17.5 | — | — | — | — | — | — | — | — |
| MMA/S Total (MMA/S Ratio) | | | | | | | | | |
| MMA/S (MMA/S) | — | — | — | — | — | — | — | — | — |
| Intermediate Graft Stage | | | | | | | | | |
| MMA | — | — | — | — | — | — | — | — | — |
| S | — | — | — | — | — | — | — | — | — |
| MMA/S Total (MMA/S) | — | — | — | — | 5.0 (2.7/2.3) | 5.0 (2.5/2.5) | 5.0 (2.8/2.2) | 10.0 (5.6/4.4) | 5.0 (2.9/2.1) |
| Final Graft Stage | | | | | | | | | |
| MMA | 17.5 | — | — | — | — | — | — | — | — |
| S | — | 10.0 | 10.0 | 10.0 | 13.6 | 15.0 | 13.1 | 10.9 | 12.5 |
| MMA/S Total (MMA/S) | — | — | — | — | — | — | — | — | — |
| Total MMA/S Ratio of Graft Stages | 1.0:1.0 | 2.0:1.0 | 2.0:1.0 | 2.0:1.0 | 1.2:1.0 | 1.0:1.0 | 1.3:1.0 | 1.3:1.0 | 1.4:1.0 |

| EXAMPLE | 19 | 20 | 21 | 22 |
|---|---|---|---|---|
| Composition | | | | |
| Substrate Stage | | | | |
| Butadiene | 46.15 | 49.7 | 49.7 | 46.15 |
| Styrene | 17.87 | 19.25 | 19.25 | 17.87 |
| Divinylbenzene | 0.98 | 1.05 | 1.05 | 0.98 |
| Particle Mean Diameter Vol. Avg. (nm) | 182 | 188 | 185 | 188 |
| First Graft Stage | | | | |
| MMA | 14.6 | 15.0 | 15.0 | 21.6 |
| S | — | — | — | — |
| MMA/S Total (MMA/S Ratio) | | | | |
| MMA/S (MMA/S) | — | — | — | — |
| Intermediate Graft Stage | | | | |
| MMA | — | — | — | — |
| S | — | — | — | 11.7 |
| MMA/S Total (MMA/S) | 10.0 (5.8/4.2) | 7.5 (5.0/2.5) | 7.5 (5.0/2.5) | — |
| Final Graft Stage | | | | |
| MMA | — | — | — | 1.7 |
| S | 10.4 | 7.5 | 7.5 | — |
| MMA/S Total (MMA/S) | — | — | — | — |
| Total MMA/S Ratio of Graft Stages | 1.4:1.0 | 2.0:1.0 | 2.0:1.0 | 2.0:1.0 |

*A*Agglomerted

EXAMPLE 23

A well mixed dry blend of 105.3 parts of PVC Masterbatch I prepared according to the method of Procedure E, and 11.0 parts of a multi-stage rubber-based (MBS) resin prepared according to the method of Example 1 (B(46.15)/S(17.87)/DVB(0.98)//MMA(22)/S-(13)) was roll-milled for three minutes at 325° F.

Cut specimens were compression molded at 350° F. with a 5 minute dwell. 25 tons of pressure were then applied and cooling started. Test bars were then tensile cut, notched and allowed to condition before notched Izod impact was tested with a 10#hammer.

Properties are summarized in Table 2.

EXAMPLE 24

For optical properties, 105.3 parts of PVC Masterbatch I prepared according to the method of Procedure E were dry mixed with 12.0 parts of the MBS resin of Example 1. The dry mix was then roll-milled for 8 minutes at 325° F.

Die cut specimens of 2.5 inch diameter were compression molded at 350° F. under 45,000 pounds of pressure. The molded plaques were tested for YI, total transmittance, and haze by a well calibrated Hunter Meter D 25P-9.

Properties are summarized in Table 2.

COMPARATIVE EXAMPLE 25*

The procedure of Example 23 was followed substituting a dry blend of 105.3 parts of PVC Masterbatch I prepared according to the method of Procedure E and 11.0 parts of a multi-stage rubber-based resin prepared according to the method of Comparative Example 2* (B(46.15)/S(17.87)/DVB(0.98)//MMA(17.5)/S(17.5)).

Properties are summarized in Table 2.

COMPARATIVE EXAMPLE 26*

The procedure of Example 24 was followed substituting a dry mix of 105.3 parts of PVC Masterbatch I prepared according to the method of Procedure E and 12.0 parts of the MBS resin prepared according to the method of Comparative Example 2*.

Properties are summarized in Table 2.

EXAMPLE 27

The procedure of Example 23 was followed substituting a dry blend of 105.3 parts of PVC Masterbatch I prepared according to the method of Procedure E and 11.0 parts of a multi-stage rubber-based resin prepared according to the method of Example 3 (B(49.07)/S(14.95)/DVB(0.98)//MMA(22)/S(13)).

Properties are summarized in Table 2.

EXAMPLE 28

The procedure of Example 24 was followed substituting a dry mix of 105.3 parts of PVC Masterbatch I prepared according to the method Procedure E and 12.0 parts of the MBS resin prepared according to the method of Example 3.

Properties are summarized in Table 2.

EXAMPLE 29

The procedure of Example 23 was followed substituting a dry blend of 105.3 parts of PVC Masterbatch I prepared according to the method of Procedure E and 11.0 parts of a multi-stage rubber-based resin prepared according to the method of Example 4 (B(46.15)/S(17.87)/DVB(0.98)//MMA(22)/S(13)).

Properties are summarized in Table 2.

EXAMPLE 30

The procedure of Example 24 was followed substituting a dry mix of 105.3 parts of PVC Masterbatch I prepared according to the method of Procedure E and 12.0 parts of the MBS resin prepared according to the method of Example 4.

Properties are summarized in Table 2.

EXAMPLE 31

The procedure of Example 23 was followed substituting a dry blend of 105.3 parts of PVC Masterbatch I prepared according to the method of Procedure E and 11.0 parts of a multi-stage rubber-based resin prepared according to the method of Example 5 (B(48.75)/S(16.25)//MMA(22)/S(13)).

Properties are summarized in Table 2.

EXAMPLE 32

The procedure of Example 24 was followed substituting a dry mix of 105.3 parts of PVC Masterbatch I prepared according to the method of Procedure E and 12.0 parts of the MBS resin prepared according to the method of Example 5.

Properties are summarized in Table 2.

EXAMPLE 33

The procedure of Example 23 was followed substituting a dry blend of 105.3 parts of PVC Masterbatch I prepared according to the method of Procedure E and 12.0 parts of a multi-stage rubber-based resin prepared according to the method of Example 6 (B(42.6)/S(16.5)/DVB(0.9)//MMA(26.7)//S(13.3)).

Properties are summarized in Table 2.

EXAMPLE 34

The procedure of Example 23 was followed substituting a dry blend of 105.3 parts of PVC Masterbatch I prepared according to the method of Procedure E and 12.0 parts of a multi-stage rubber-based resin prepared according to the method of Example 7 (B(46.15)/S(17.85)/DVB(0.98)//MMA(23.3)//S(11.7)).

Properties are summarized in Table 2.

COMPARATIVE EXAMPLE 35*

The procedure of Example 23 was followed substituting a dry blend of 105.3 parts of PVC Masterbatch I prepared according to the method of Procedure E and 11.0 parts of a multi-stage rubber-based resin prepared according to the method of Comparative Example 8* (B(46.15)/S(17.87)/DVB(0.98)//MMA(17.5)//S(17.5)).

Properties are summarized in Table 2.

COMPARATIVE EXAMPLE 36*

The procedure of Example 24 was followed substituting a dry mix of 105.3 parts of PVC Masterbatch I prepared according to the method of Procedure E and 12.0 parts of the MBS resin prepared according to the method of Comparative Example 8*.

Properties are summarized in Table 2.

COMPARATIVE EXAMPLE 37*

The procedure of Example 23 was followed substituting a dry blend of 105.3 parts of PVC Masterbatch I prepared according to the method of Procedure E and 12.0 parts of a multi-stage rubber-based resin prepared according to the method of Comparative Example 9* (B(45.16)/S(17.87)/DVB(0.98)//MMA (17.5)//S(17.5)).

Properties are summarized in Table 2.

COMPARATIVE EXAMPLE 38*

The procedure of Example 23 was followed substituting a dry blend of 105.3 parts of PVC Masterbatch I prepared according to the method of Procedure E and 12.0 parts of a multi-stage rubber-based resin prepared according to the method of Comparative Example 10* (B(46.15)/S(17.87)/DVB(0.98)//S(17.5)//MMA(17.5)).

Properties are summarized in Table 2.

EXAMPLE 39

The procedure of Example 23 was followed substituting a dry blend of 105.3 parts of PVC Masterbatch I prepared according to the method of Procedure E and 12.0 parts by weight of a multi-stage rubber-based resin prepared according to the method of Example 11 (B(49.7)/S(19.25)/DVB(1.05)//MMA(20.0)//S(10.0)).

Properties are summarized in Table 2.

EXAMPLE 40

The procedure of Example 23 was followed substituting a dry blend of 105.3 parts by weight of PVC Masterbatch I prepared according to the method of Procedure E and 12.0 parts by weight of a multi-stage rubber-based resin prepared according to the method of Example 12 (B(49.7)/S(19.25)/DVB(1.05)//MMA(20.0)//S(10.0)).

Properties are summarized in Table 2.

EXAMPLE 41

The procedure of Example 23 was followed substituting a dry blend of 105.3 parts of PVC Masterbatch I prepared according to the method of Procedure E and 12.0 parts of a multi-stage rubber-based resin prepared according to the method of Example 13 (B(49.7)/S(19.25)/DVB(1.05)//MMA(20.0)//S(10.0)).

Properties are summarized in Table 2.

EXAMPLE 42

The procedure of Example 23 was followed substituting a dry blend of 105.3 parts of PVC Masterbatch II prepared according to the method of Procedure F and 12.0 parts of a multi-stage rubber-based resin prepared according to the method of Example 14 (B(46.15)/S(17.87)/DVB(0.98)//MMA(16.4)//-MMA(2.7)/S(2.3)//S(13.6)).

Properties are summarized in Table 2.

COMPARATIVE EXAMPLE 43*

The procedure of Example 23 was followed substituting a dry blend of 105.3 parts of PVC Masterbatch II prepared according to the method of Procedure F and 12.0 parts of a multi-stage rubber-based resin prepared according to the method of Comparative Example 15* (B(46.15)/S(17.87)/DVB(0.98)//MMA(15.0)//-MMA(2.5)//S(15.0)).

Properties are summarized in Table 2.

EXAMPLE 44

The procedure of Example 23 was followed substituting a dry blend of 105.3 parts of PVC Masterbatch II prepared according to the method of Procedure F and 12.0 parts of a multi-stage rubber-based resin prepared according to the method of Example 16 (B(46.15)/S(17.87)/DVB(0.98)//MMA(17.2)//-MMA(2.8)/S(22)//S (13.1)).

Properties are summarized in Table 2.

EXAMPLE 45

The procedure of Example 23 was followed substituting a dry blend of 105.3 parts of PVC Masterbatch II prepared according to the method of Procedure F and 12.0 parts of a multi-stage rubber-based resin prepared according to the method of Example 17 (B(46.15)/S(17.87)/DVB(0.98)//MMA(14.1)//-MMA(5.6)/S(4.4)//S(10.9)).

Properties are summarized in Table 2.

EXAMPLE 46

The procedure of Example 23 was followed substituting a dry blend of 105.3 parts of PVC Masterbatch II prepared according to the method of Procedure F and 12.0 parts of a multi-stage rubber-based resin prepared according to the method of Example 18 (B(46.15)/S(17.87)/DVB(0.98)//MMA(17.5)//-MMA(2.9)/S(2.1)//S(12.5)).

Properties are summarized in Table 2.

EXAMPLE 47

The procedure of Example 23 was followed substituting a dry blend of 105.3 parts of PVC Masterbatch II prepared according to the method of Procedure F and 12.0 parts of a multi-stage rubber-based resin prepared according to the method of Example 19 (B(46.15)/S(17.87)/DVB(0.98)//MMA(14.6)//-MMA(5.8)/S(4.2)//S(10.4)).

Properties are summarized in Table 2.

EXAMPLE 48

The procedure of Example 23 was followed substituting a dry blend of 105.3 parts of PVC Masterbatch I prepared according to the method of Procedure E and 12.0 parts of a multi-stage rubber-based resin prepared according to the method of Example 20 (B(49.7)/S(19.25)/DVB(1.05)//MMA(15.0)//-MMA(5.0)/S(2.5)//S(7.5)).

Properties are summarized in Table 2.

EXAMPLE 49

The procedure of Example 23 was followed substituting a dry blend of 105.3 parts of PVC Masterbatch I prepared according to the method of Procedure E and 12.0 parts of a multi-stage rubber-based resin prepared according to the method of Example 21 (B(49.7)/S(19.25)/DVB(1.05)//MMA(15.0)//-MMA(5.0)/S(2.5)//S(7.5)).

Properties are summarized in Table 2.

EXAMPLE 50

The procedure of Example 23 was followed substituting a dry blend of 105.3 parts of PVC Masterbatch I prepared according to the method of Procedure E and 12.0 parts by weight of a multi-stage rubber-based resin prepared according to the method of Example 22 (B(46.15)/S(17.87)/DVB(0.98)//MMA(21.6)//S(11.7)-//MMA(1.7)).

Properties are summarized in Table 2.

Examples 23, 27–34 and 39–48 when compared to Comparative Examples 25*, 26*, 35*–38* and 43* demonstrate that a balance of good impact strength and low yellowness index in clear PVC resin compositions can be obtained using modifiers prepared according to the present invention.

Furthermore, it is shown that a three stage grafting onto the rubber-based substrate stage is preferable to two stage grafting, which in turn is preferable to a single stage grafting, in achieving a balance between impact strength and low yellowness. Balanced performance in optical and impact properties are demonstrated to optimize with a three stage grafting with a middle copolymerization methyl(meth)acrylate/styrene stage between two homopolymerization stages, one of methyl(meth)acrylate and one of styrene.

If the grafting weight ratio of methacrylate, herein methyl(meth)acrylate, in all graft stages combined to vinyl aromatic, herein styrene, in all graft stages combined is kept as high as 2.0, a blue tinged yellowness index of −2.1 is achieved. It is seen that when the ratio stage or graft stages, the stress-whitening resistance in PVC can be adjusted without affecting the low yellowness index or blue tint as claimed by the ratio.

TABLE 2

PVC and Multi-Stage Rubber-Based Resin Compositions

| EXAMPLE | 23 | 24 | 25* | 26* | 27 | 28 | 29 | 30 | 31 | 32 | 33 | 34 | 35* | 36* |
|---|---|---|---|---|---|---|---|---|---|---|---|---|---|---|
| Composition PVC | | | | | | | | | | | | | | |
| Masterbatch I$^A$ | 105.3 | 105.3 | 105.3 | 105.3 | 105.3 | 105.3 | 105.3 | 105.3 | 105.3 | 105.3 | 105.3 | 105.3 | 105.3 | 105.3 |
| Masterbatch II$^B$ | — | — | — | — | — | — | — | — | — | — | — | — | — | — |
| Multi-Stage Rubber-Based Resin | 11.0$^C$ | 12.0$^C$ | 11.0$^D$ | 12.0$^D$ | 11.0$^E$ | 12.0$^E$ | 11.0$^F$ | 12.0$^F$ | 11.0$^G$ | 12.0$^G$ | 12.0$^H$ | 12.0$^I$ | 11.0$^J$ | 12.0$^J$ |
| Total MMA:S Ratio of Graft Stages | 1.7:1.0 | 1.7:1.0 | 1.0:1.0 | 1.0:1.0 | 1.7:1.0 | 1.7:1.0 | 1.7:1.0 | 1.7:1.0 | 1.7:1.0 | 1.7:1.0 | 1.7:1.0 | 2.0:1.0 | 2.0:1.0 | 1.0:1.0 | 1.0:1.0 |
| Impact Properties | | | | | | | | | | | | | | |
| ⅛" Izod (ft-lbs/in.) | 3.3 | — | 3.0 | — | 2.9 | — | 4.8 | — | 4.9 | — | 9.2 | 4.8 | 11.6 | — |
| D/B Ratio | 0:6 | — | 0:6 | — | 0:6 | — | 1:5 | — | 1:5 | — | 4:2 | 1:5 | 3/3 | — |
| Optical Properties | | | | | | | | | | | | | | |
| % Trans | — | 80.0 | — | 81.7 | — | 80.0 | — | 80.4 | — | 75.7 | 82.5 | 82.1 | — | 82.3 |
| YI | — | 0.4 | — | 3.9 | — | 0.4 | — | 0.4 | — | 0.4 | 1.4 | 1.4 | — | 5.4 |

| EXAMPLE | 37* | 38* | 39 | 40 | 41 | 42 | 43* | 44 | 45 | 46 | 47 | 48 | 49 | 50 |
|---|---|---|---|---|---|---|---|---|---|---|---|---|---|---|
| Composition PVC | | | | | | | | | | | | | | |
| Masterbatch I$^A$ | 105.3 | 105.3 | 105.3 | 105.3 | 105.3 | — | — | — | — | — | — | 105.3 | 105.3 | 105.3 |
| Masterbatch II$^B$ | — | — | — | — | — | 105.3 | 105.3 | 105.3 | 105.3 | 105.3 | 105.3 | — | — | — |
| Multi-Stage Rubber-Based Resin | 12.0$^K$ | 12.0$^L$ | 12.0$^M$ | 12.0$^N$ | 12.0$^O$ | 12.0$^P$ | 12.0$^Q$ | 12.0$^R$ | 12.0$^S$ | 12.0$^T$ | 12.0$^U$ | 12.0$^V$ | 12.0$^W$ | 12.0$^X$ |
| Total MMA:S Ratio of Graft Stages | 1.0:1.0 | 1.0:1.0 | 2.0:1.0 | 2.0:1.0 | 2.0:1.0 | 1.2:1.0 | 1.0:1.0 | 1.3 | 1.3:1.0 | 1.4:1.0 | 1.4:1.0 | 2.0:1.0 | 2.0:1.0 | 2.0:1.0 |
| Impact Properties | | | | | | | | | | | | | | |
| ⅛" Izod (ft-lbs/in.) | 6.1 | 17.9 | 3.6 | 16.2 | 13.6 | 22.3 | 24.7 | 22.9 | 20.2 | 23.9 | 22.5 | 22.2 | 18.5 | 18.4 |
| D/B Ratio | 1:5 | 6:0 | 0:6 | 5:1 | 5:1 | 6:0 | 6:0 | 6:0 | 6:0 | 6:0 | 6:0 | 6:0 | 5:1 | 5:1 |
| Optical Properties | | | | | | | | | | | | | | |
| % Trans | 82.8 | 82.8 | 81.9 | 79.6 | 79.8 | 87.9 | 88.2 | 87.9 | 87.2 | 87.4 | 86.8 | 77.9 | 82.1 | 82.7 |
| YI | 4.4 | 7.1 | 0.8 | −1.9 | −0.2 | 3.7 | 5.8 | 3.5 | 2.4 | 2.9 | 2.5 | −2.1 | −1.7 | −1.3 |

$^A$Masterbatch I - 100.0 parts of poly(vinyl chloride) resin (B221-RV of 1.77 - Hooker Chemicals), 2.0 parts of stabilizer (Argus Mark 1414A), 2.0 parts of processing aid (K-120N,), 1.3 parts of lubricant (0.4 parts of "E" Wax - Hoechst), 0.5 part of XL 165 - Hoechst, 0.4 part of Loxiol G60 - Henkel) and 0.075 part of toner Masterbatch (99.25 wt % B221 PVC, 0.75 wt % Calco oil Violet ZIRS) - (Procedure E)
$^B$Masterbatch II - 100.0 parts of poly(vinyl chloride) resin (Oxy 185 - Oxy Chem), 2.0 parts of stabilizer (Argus Mark 1414A), 2.0 parts of processing aid (K-120N, Rohm & Haas), 1.3 parts of lubricant (0.4 parts of "E" Wax - Hoechst), 0.5 part of XL 165 Hoechst, 0.4 part of Loxiol G60 - Hinkel) and 0.075 part of toner Masterbatch (99.25 wt % B221 PVC, 0.75 wt % Calco oil Violet ZIRS) - (Procedure F)
$^C$B(46.15)/S(17.87)/DVB(0.98)//MMA(22)/S(13) - (Example 1)
$^D$B(46.15)/S(17.87)/DVB(0.98)//MMA(17.5)/S(17.5) - (Comparative Example 2*)
$^E$B(49.07)/S(14.95)/DVB(0.98)//MMA(22)/S(13) - (Example 3)
$^F$B(46.15)/S(17.87)/DVB(0.98)//MMA(22)/S(13) - (Example 4)
$^G$B(48.75)/S(16.25)//MMA(22)/S(13) - (Example 5)
$^H$B(42.6)/S(16.5)/DVB(0.9)//MMA(26.7)//S(13.3) - (Example 6)
$^I$B(46.15)/S(17.87)/DVB(0.98)//MMA(23.3)//S(11.7) - (Example 7)
$^J$B(46.15)/S(17.87)/DVB(0.98)//MMA(17.5)//S(17.5) - (Comparative Example 8*)
$^K$B(46.15)/S(17.87)/DVB(0.98)//MMA(17.5)//S(17.5) - (Comparative Example 9*)
$^L$B(46.15)/S(17.87)/DVB(0.98)//S(17.5)//MMA(17.5) - (Comparative Example 10*)
$^M$B(49.7)/S(19.25)/DVB(1.05)//MMA(20.0)//S(10.0) - (Example 11)
$^N$B(49.7)/S(19.25)/DVB(1.05)//MMA(20.0)//S(10.0) - (Example 12)
$^O$B(49.7)/S(19.25)/DVB(1.05)//MMA(20.0)//S(10.0) - (Example 13)
$^P$B(46.15)/S(17.87)/DVB(0.98)//MMA(16.4)//MMA(2.7)/S(2.3)//S(13.6) - (Example 14)
$^Q$B(46.15)/S(17.87)/DVB(0.98)//MMA(15.0)//MMA(2.5)/S(2.5)//S(15.0) - (Comparative Example 15*)
$^R$B(46.15)/S(17.87)/DVB(0.98)//MMA(17.2)//MMA(2.8)/S(2.2)//S(13.1) - (Example 16)
$^S$B(46.15)/S(17.87)/DVB(0.98)//MMA(14.1)//MMA(5.6)/S(4.4)//S(10.9) - (Example 17)
$^T$B(46.15)/S(17.87)/DVB(0.98)//MMA(17.5)//MMA(2.9)/S(2.1)//S(12.5) - (Example 18)
$^U$B(46.15)/S(17.87)/DVB(0.98)//MMA(14.6)//MMA(5.8)/S(4.2)//S(10.4) - (Example 19)
$^V$B(49.7)/S(19.25)/DVB(1.05)//MMA(15.0)//MMA(5.0)/S(2.5)//S(7.5) - (Example 20)
$^W$B(49.7)/S(19.25)/DVB(1.05)//MMA(15.0)//MMA(5.0)/S(2.5)//S(7.5) - (Example 21)
$^X$B(46.15)/S(17.87)/DVB(0.98)//MMA(21.6)//S(11.7)//MMA(1.7) - (Example 22)

is at least 1.2, the yellowness index remains below 3.7.

Because various types of cross-linkers and graft-linkers can be present or absent from the compositions of the present invention in either the modifier substrate All patents, applications, publications, and test methods mentioned above are hereby incorporated by reference.

Many variations of the present invention will suggest themselves to those skilled in the art in light of the above detailed description. Such obvious variations are within the full intended scope of the claims.

I claim:

1. A multi-stage rubber-based resin composition comprising:
    (a) a polymeric substrate stage comprising a conjugated diolefin-based polymer or copolymer; and
    (b) at least three polymeric graft stages graft polymerized in the presence of said substrate stage;
    wherein the weight ratio of acrylate in all graft stages combined to vinyl aromatic in all graft stages combined is at least 1.2:1, wherein said multi-stage rubber-based resin composition comprises a first graft stage of methylmethacrylate, an intermediate graft stage of methylmethacrylate/styrene copolymer, and a final graft stage selected from the group consisting of methylmethacrylate and styrene.

2. A multi-stage rubber-based resin composition comprising:
    (a) a polymeric substrate stage comprising a conjugated diolefin-based polymer or copolymer; and
    (b) at least three polymeric graft stages graft polymerized in the presence of said substrate stage;
    wherein the weight ratio of alkyl(meth)acrylate in all graft stages combined to vinyl aromatic in all graft stages combined is at least 1.2:1, wherein said multi-stage rubber-based resin composition comprises a first graft stage of methylmethacrylate, an intermediate graft stage of methylmethacrylate/styrene copolymer, and a final graft stage selected from the group consisting of methylmethacrylate and styrene wherein the ratio of methylmethacrylate to styrene in the copolymer of the intermediate stage ranges from 1:2 to 2:2, and wherein said substrate stage is present at a level of from 50 to 80 parts by weight based upon 100 parts by weight of substrate stage and all graft stages combined.

3. The multi-stage rubber-based resin composition of claim 1 wherein said substrate stage comprises from 50 to 90 parts by weight of butadiene, from 10 to 50 parts by weight of styrene, and from 0 to 5 parts by weight of divinylbenzene, based on 100 parts by weight of butadiene, styrene and divinylbenzene combined.

4. The multi-stage rubber-based resin composition of claim 1 wherein said substrate stage comprises from 65 to 85 parts by weight of butadiene, from 15 to 35 parts by weight of styrene, and from 0.5 to 2 parts by weight of divinylbenzene, based on 100 parts by weight of butadiene, styrene and divinylbenzene combined.

5. The composition of claim 1 wherein said substrate stage in the form of substrate particles having a volume average mean diameter ranging from 16 nanometers to 400 nanometers.

6. The composition of claim 1 wherein said intermediate graft stage copolymer has a ratio of methylmethacrylate to styrene of from 1:2 to 2:1.

7. The composition of claim 1 wherein substrate is present at a level of from 50 to 80 parts by weight based upon 100 parts by weight of substrate stage and all graft stages combined.

8. A process for producing a multi-stage rubber-based resin composition comprising the steps of:
    (a) providing a polymeric substrate stage by the polymerization of a conjugated diolefin-based monomer, optionally other monomers copolymeriable therewith; and
    (b) graft polymerizing in the presence of said substrate stage, at least three polymeric graft stages;
    wherein the weight ratio of alkyl(meth)acrylate in all graft stages combined to vinyl aromatic in all graft stages combined is at least 1.2:1; to yield a multi-stage rubber-based resin composition, wherein said multi-stage rubber-based resin composition comprises a first graft stage of methylmethacrylate, an intermediate graft stage of methylmethacrylate/styrene copolymer, and a final graft stage selected from the group consisting of methylmethacrylate and styrene.

* * * * *